Inventor
PATRICK E. CAVANAGH

Jan. 6, 1959  P. E. CAVANAGH  2,867,118
TRANSDUCER AND STRESS MEASURING MEANS
Filed Sept. 19, 1955  2 Sheets-Sheet 2

Inventor
PATRICK E. CAVANAGH
By: Featherstonhaugh & Co.
Att'ys

United States Patent Office 2,867,118
Patented Jan. 6, 1959

2,867,118

TRANSDUCER AND STRESS MEASURING MEANS

Patrick Edgar Cavanagh, Oakville, Ontario, Canada, assignor to Ontario Research Foundation, Toronto, Ontario, Canada, a corporation, by special act, of Ontario Application September 19, 1955, Serial No. 535,153

6 Claims. (Cl. 73—141)

This invention relates to means for transducing mechical stress to an electrical signal and for measuring mechanical stress.

It is known to measure mechanical stress by applying such stress to a magnetostrictive core and measuring the consequent change of permeability of said core. When an electrical signal is applied to a winding about said core, the stress thereon causes a consequent impedance change in the coil and a transducer is formed.

It is an object of this invention to provide improved apparatus for so measuring stress and an improved mechanical-electrical transducer.

It is an object of this invention to provide apparatus for magnetically measuring stress wherein the stress to be applied to the core is never so great that it will have a permanent effect on the magnetic qualities of the core. In practice, permanent effects on the magnetic qualities are noted, in most materials when the stress reaches ⅓ the yield point for the core material.

It is an object of this invention to provide a transducer wherein the results of permeability changes in the stressed core are applied to opposite arms of a Wheatstone bridge whereby the effect of the stress on the core permeability is magnified for measurement at the bridge terminals.

The invention provides apparatus for measuring stress comprising providing a magnetostrictive material core adapted to be stressed, said core being of such dimensions that the stress to be created in such a method is less than ⅓ yield stress the material forming the core; measuring the permeability of such core while unstressed; applying the stress to be measured to said core; and measuring the resulting core permeability.

The invention also provides a transducer comprising a first magnetostrictive core, a second magnetostrictive core, a first pair of windings adjacent said first magnetostrictive core, a second pair of windings adjacent said second magnetostrictive core, a Wheatstone bridge, A. C. input terminals thereon, A. C. output terminals on opposite junctions thereof, said first pair of windings being connected in opposite arms of said bridge, said second pair of windings being connected in the other opposite arms of said bridge, and stress applicable connections on each end of said first magnetostrictive core.

Preferably, one magnetostrictive core is positively magnetostrictive, the other being negatively magnetostrictive and the cores are physically combined so that the stress causing force, applied to the first magnetostrictive core is also applied to the second, whereby the bridge output terminals are adapted to exhibit a magnified impedance effect for a given core stress.

In drawings which illustrate embodiments of the invention:

Figure 2:
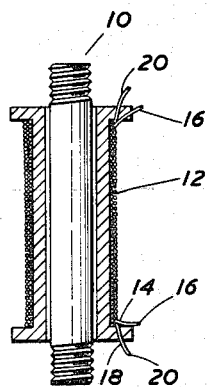
Figure 2 shows a preferred core construction.

With reference first to Figure 2, the core 10 of the invention is composed of a highly magnetostrictive material. Nickel, in commercially pure form, is the preferred material having been found sufficiently magnetostrictive for these purposes.

The nickel is preferably cold-rolled and then annealed in hydrogen at 1300° F. for 120 minutes.

The coil 12 about the core is preferably bifilar wound. Such winding when the respective bifilar windings are connected in opposite arms of a bridge has been found to be more sensitive than other coil arrangements. In addition a certain amount of self-shielding from extrinsic magnetic effects is achieved by this means.

In accord with the inventive method, stress is applied to the core 10 and the consequent impedance of the coil 12 measured. By suitable calibration, the impedance values obtained are translatable into stress values. However, to maintain the calibration it has been found that the limit of the stress which can be temporarily applied without effecting a permanent change in the permeability is about ⅓ of the mechanical yield point of the core material. Such stress limit might be designated the magnetic elastic limit.

The core shown is provided therefor with a bifilar wound coil 12 composed of a winding 14 having terminals 16 and a winding 18 having terminals 20.

Figure 1:
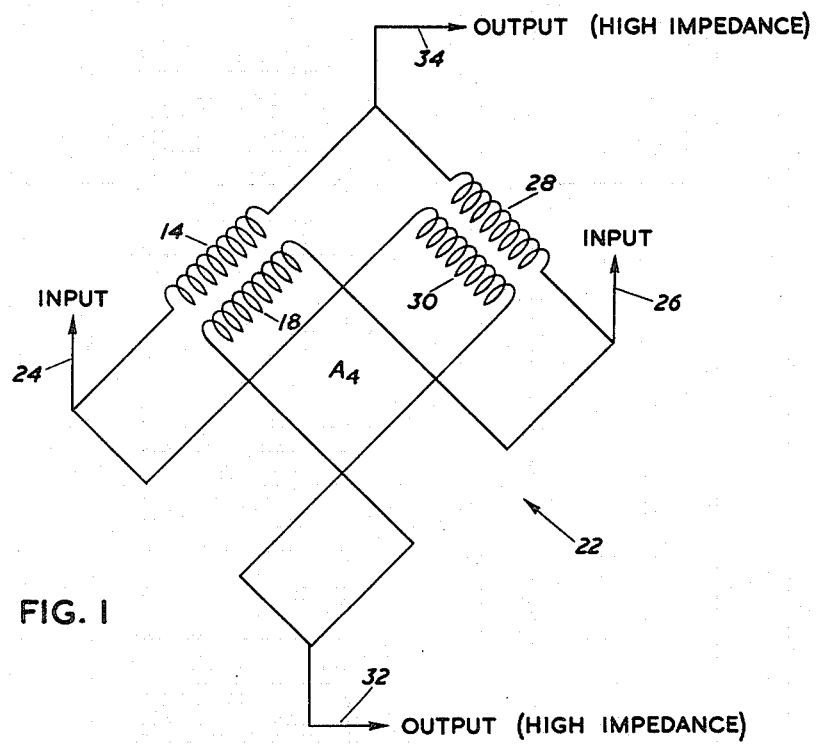
Figure 1 shows the electrical arrangement of the transducer.

In the transducer shown in Figure 1, the windings 14 and 18 are shown connected in opposite arms of a Wheatstone bridge 22 having output terminals 24 and 26 to which a high impedance measuring instrument may be connected. Such impedance should be in the neighbourhood of 10 million ohms or more. It is believed that results obtained with a low impedance measuring instrument will be quite different since current will be drawn from the bridge and such latter instrument should not be used in carrying out the objects of this invention.

In the other opposite pair of arms of the bridge are connected a second pair of windings 28 and 30.

This second pair of windings preferably forms a bifilar wound coil about a core (not shown), the windings and the core being generally of the same physical arrangement as core 10 and coil 12.

The core is preferably stressed but may be unstressed but does suffer the same temperature and extrinsic magnetic effects as core 10.

The windings 28 and 30 thus effectively compensate in the bridge circuit for the temperature and extrinsic magnetic effects on core 10 and windings 14 and 18 so that the impedance values indicated at the output terminal 32 and 34 are effectively due to the permeability changes in core 10 or to core 10 in the compensating stressed coil due to the stress imposed thereon. The cumulative effect of the two windings 14 and 18 about the core 10 increases the resulting signal at the terminals 32 and 34 due to the permeability change in core 10.

The voltage applied must be alternating current and 60 cycle may conveniently be used. For minimizing external interference 1000 cycle may be used.

The ends of core 10 are suitably threaded for attachment of stress applying means.

Figure 3:
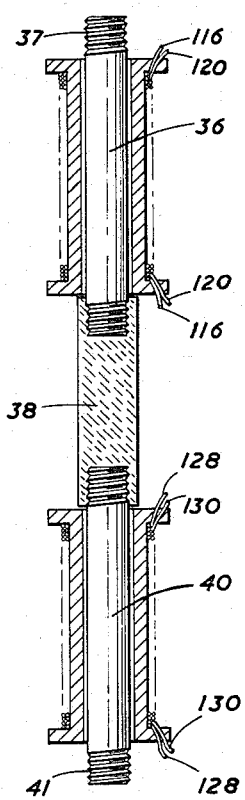
Figure 3 shows the preferred transducer arrangement using two stressed cores in an assembly.

The cumulative impedance effect upon the signal may further be increased by substituting for the pair of respective coils and cores described above, the pair of coils and cores shown in the core assembly of Figure 3.

The preferred core material, commercially pure nickel has negative magnetostriction.

The preferred embodiment of the invention is shown in Figure 3 where a core assembly is shown wherein an upper core 36 of a negative magnetostriction is threaded into a junction member 38 of preferably non-magnetic properties, such as plastic. Into the other end of such junction member 38 is threaded a core 40 of positive magnetostrictive material.

Stress applying connections are provided at the upper extremity of core 36 (connection designated 37) and at the lower extremity of core 40 (connection designated 41).

The preferred positive magnetostrictive material is cobalt-iron alloy which should also be cold rolled and annealed in hydrogen.

Core 36 is provided with a bifilar coil comprising a pair of windings having terminals 116, 120 respectively.

Core 40 is provided with a bifilar coil comprising a pair of windings having terminals 128, 130, respectively.

Figure 6:
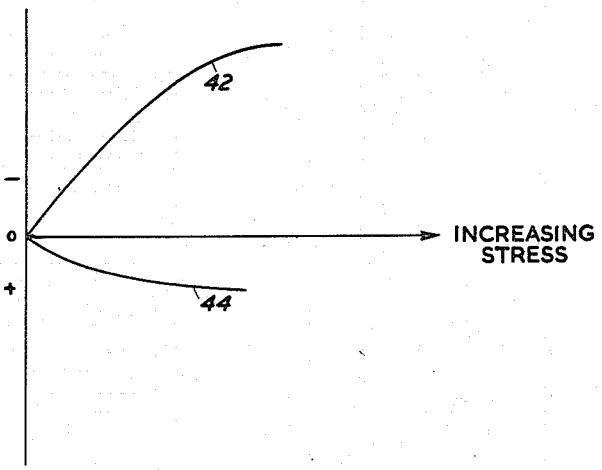
Figure 6 shows the relative permeability changes with stress of a nickel and a cobalt-iron alloy.

The relative permeability changes with stress for nickel and cobalt-iron alloy are shown in Figure 6 by lines 42 and 44 respectively.

Windings 114 and 118 are connected in the transducer of Figure 1 in place of the windings 14 and 18.

Windings 128 and 130 are connected in the transducer of Figure 1 in place of the windings 28 and 30.

Thus the replacement of windings 28 and 30 (which have a zero magnetostrictive effect on the signal at terminals 32 and 34) by windings 128 and 130 (having a positive magnetostrictive effect on the signal at terminals 32 and 34) augments the magnitude of the signal appearing at these terminals for a given stress applied at 37 and 41.

It will be obvious that the same force applied to core 36 is transmitted through junction member 38 and applied to core 40, be it tensile or compressive. However, by reference to curves 42 and 44 of Figure 6 it will be seen that the positive magnetostrictive effect in cobalt-iron alloy is considerably less than the negative magnetostrictive effect in nickel. If it were desired in the units 36—38—40 to equalize the magnetostrictive effects of the nickel core 36 and cobalt-iron alloy core 40 then the cross sectional area of core 40 should be sufficiently less than that of the core 36 to increase the stress therein to a point that the magnetostrictive effects are the same in both cores.

Figure 4:
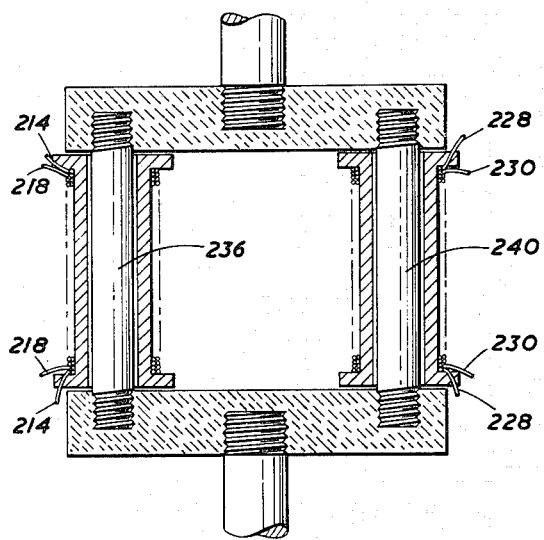
Figure 4 shows another alternative core assembly with both cores stressed.

Alternatively to the core assembly 36—38—40, an assembly may be used as shown in Figure 4 where a negatively magnetostrictive core 236 provided with a bifilar coil having windings 214, 218 is structurally bridged to a positively magnetostrictive core 240 provided with a bifilar coil having windings 228 and 230. Stress may be applied to the bridging member to equally or proportionally stress cores 238 and 240. Windings 214, 218, 228, 230 should be connected in the circuit of Figure 1 in the respective places of windings 14, 18, 28 and 30.

Figure 5:
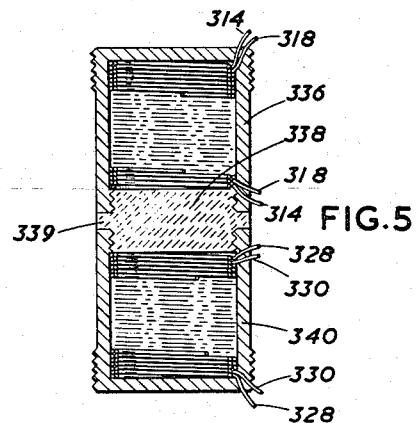
Figure 5 shows a further preferred core arrangement, the assembly being an alternative to that in Figure 3.

Another alternative preferred arrangement to that shown in Figure 3 especially suited to compressive stress measurement is illustrated in Figure 5. Here the magnetostrictive cores of earlier described embodiments are replaced by magnetostrictive shells comprising a negative magnetostrictive shell 336 and a positive shell 340. The shells are threaded to the top and bottom respectively of a junction member 338 provided with a central peripheral flange 339 adapted to form a compressive "cushion" between the lower edge of shell 336 and the upper edge of shell 340 under compressive stress.

The windings 314, 318 are mounted inside shell 336 and are connected as are windings 14 and 18 in Figure 1.

The windings 328 and 330 are mounted inside shell 340 and are connected as are windings 28 and 30 in Figure 1.

In addition to the advantages of this construction in the measurement of compressive stress a further advantage accrues in that the overlying shell shields the windings mounted therein from extrinsic magnetic effects.

In this last embodiment the shells 336 and 340 are electrical equivalents to the cores previously described and the word "core" will be understood to include such shell in both the introduction to this specification and in the claims.

In all embodiments the preferred operation of the transducer is to balance the bridge at 0 stress and apply stresses up to ⅓ the yield point of the respective cores, while applying an A. C. signal and measuring the consequent unbalance of the bridge.

I claim:

1. A means for measuring stress comprising: a core of positively magnetostrictive and a core of negatively magnetostrictive material, a bifilar wound coil adjacent each of said cores, means for stressing said cores in a predetermined ratio, a Wheatstone bridge circuit containing the respective windings of one of said bifilar wound coils in one pair of opposite arms and the respective windings of the other of said bifilar wound coils in the other pair of opposite arms.

2. A means as claimed in claim 1 wherein said negative magnetostrictive core is composed of commercially pure nickel and said positive magnetostrictive core is composed of cobalt-iron alloy.

3. A transducer as claimed in claim 1 wherein said cores are shells enclosing their respective pairs of windings.

4. A transducer comprising a first magnetostrictive core, a second magnetostrictive core, a first pair of windings adjacent said first magnetostrictive core, a second pair of windings adjacent said second magnetostrictive core, Wheatstone bridge, A. C. input terminals thereon, A. C. output terminals on opposite junctions thereof, said first pair of windings being connected in opposite arms of said bridge, said second pair of windings being connected in the other opposite arms of said bridge, and stress applicable connections on each end of said magnetostrictive core wherein said first magnetostrictive core is negatively magnetostrictive, said other magnetostrictive core is positively magnetostrictive and said cores are physically combined so that the stress causing force applied to the first magnetostrictive core will also be applied to the second magnetostrictive core.

5. A transducer as claimed in claim 4 wherein said negative magnetostrictive core is composed of commercially pure nickel and said positive magnetostrictive core is composed of cobalt-iron alloy.

6. A transducer as claimed in claim 4 wherein said cores are shells enclosing their respective pairs of windings.

References Cited in the file of this patent

UNITED STATES PATENTS

| | | |
|---|---|---|
| 1,906,551 | DeForest | May 2, 1933 |
| 2,053,560 | Janovsky | Sept. 8, 1936 |
| 2,441,158 | Krasnow | May 11, 1948 |
| 2,445,318 | Eldredge | July 20, 1948 |
| 2,461,635 | Feller | Feb. 15, 1949 |
| 2,686,039 | Bender | Aug. 10, 1954 |